United States Patent Office 3,733,390
Patented May 15, 1973

---

3,733,390
PROMOTION OF CRYSTALLINE ZEOLITE
SYNTHESIS
Harry E. Robson, Baton Rouge, La., assignor to Esso
Research and Engineering Company
No Drawing. Continuation-in-part of application Ser. No.
104,745, Jan. 7, 1971. This application July 1, 1971,
Ser. No. 159,053
Int. Cl. C01b 33/28
U.S. Cl. 423—118  13 Claims

ABSTRACT OF THE DISCLOSURE

A process for promoting the conversion of certain crystalline aluminosilicate zeolites into crystalline aluminosilicate zeolites having an entirely different crystal structure and a lower SiO$_2$/Al$_2$O$_3$ mole ratio is described. Addition of certain soluble salts to the caustic treatment is the essential feature, and in a most preferred embodiment the conversion of clinoptilolite into faujasite is promoted by the addition of certain soluble halides to the reaction mixture.

CROSS-REFERENCES TO RELATED APPLICATIONS

This application is a continuation-in-part of Ser. No. 104,745 filed on Jan. 7, 1971.

FIELD OF THE INVENTION

The present invention relates to a novel method for the preparation of crystalline aluminosilicate zeolites suitable for use in various hydrocarbon conversion processes. More particularly, the present invention relates to the conversion of various crystalline aluminosilicate zeolites to new crystalline aluminosilicates having a lower silica/alumina mole ratio but superior adsorption and catalytic properties than the starting crystalline aluminosilicate materials. Specifically, this conversion is obtained by treating the initial crystalline aluminosilicate with alkali metal hydroxide solutions containing certain added soluble promoters such that a new crystalline aluminosilicate zeolite is formed which is distinguishable from the starting material by having a distinct X-ray diffraction pattern containing new X-ray lines which did not appear in the X-ray diffraction pattern of the starting crystalline zeolites. The crystalline alluminosilicate zeolites formed by the process of the present invention have a crystal structure entirely different from that of the starting crystalline zeolite materials.

Another embodiment of the present invention relates to the preparation of new crystalline aluminosilicate zeolites having a particle size smaller than that which has heretofore been obtainable.

Still another embodiment of the present invention relates to the use of the zeolite materials formed by the process of the present invention in various hydrocarbon conversion processes. Specifically, in one aspect thereof, the crystalline zeolites formed by the process of the present invention are embedded in an organic oxide matrix, these zeolites having been subjected to ion exchange procedures whereby the alkali metal content thereof is substantially reduced.

BACKGROUND OF THE INVENTION

Crystalline aluminosilicate zeolites structurally consist basically of an open three-dimensional framework of SiO$_4$ and AlO$_4$ tetrahedra. Such tetrahedra are crosslinked by the sharing of oxygen atoms, so that the ratio of oxygen atoms to the total of the aluminum and silicon atoms is equal to 2. The negative electro-valence of tetrahydra containing aluminum is balanced by the inclusion within the crystals of cations, such as alkali or alkaline earth metal ions.

These crystalline zeolites have a crystal structure containing channels of molecular dimensions. The interstitial spaces are generally originally occupied by water of hydration. After at least partial dehydration, these zeolites may be utilized as efficient adsorbents whereby adsorbate molecules are retained within these interstitial spaces. The interstitial dimensions of openings in the crystal lattice limit the size and shape of the molecules that can be adsorbed. A separation of a mixture of various molecules, based upon molecular dimensions, wherein certain molecules are adsorbed by the zeolite while others are excluded from admission is therefore possible. It is such a characteristic of many crystalline zeolites that has led to their designation as "molecular sieves."

Molecular sieve materials are unusually porous, the pores having highly uniform molecular dimensions, generally between about 3 and about 15 angstrom units in diameter. Each crystal of molecular sieve material contains literally billions of tiny cavities or cages interconnected by channels of uniform diameter. The size and portion of the metal ions in the crystal control the effective diameter of the interconnecting channels. As initially prepared and generally as found naturally, the metal of the aluminosilicate is predominately an alkali metal, usually sodium. Such alkali metal is subject to base exchange with a wide variety of other metal ions.

In addition to their extensive use as adsorbents for hydrocarbon separation processes and the like, it has recently been found that crystalline aluminosilicate zeolites, particularly after cation exchange as described above to reduce alkali metal oxide contents, are valuable catalytic materials for various processes, particularly hydrocarbon conversion processes.

In general, the chemical formula of anhydrous crystalline aluminosilicate zeolites expressed in terms of moles may be represented as:

$$(0.9 \pm 0.2)M_{\frac{2}{n}}O : Al_2O_3 : XSiO_2$$

wherein "M" is a metal cation, generally sodium or potassium as found in the natural form or as initially synthesized; "$n$" is the valence of the metal cation; and "X" is a number from about 1.5 to about 12, said value being dependent upon the particular type of zeolite. Included among the well-known naturally occurring zeolites are clinoptilolite, mordenite, faujasite, chabazite, gmelinite, analcine, erionite, etc.

Additionally, various types of synthetic crystalline zeolites have been prepared, including synthetic faujasites known as zeolites X and Y, synthetic mordenite, etc.

The various zeolites are distinguishable by their X-ray diffraction patterns. This X-ray analysis is described in applicants' parent application, Ser. No. 104,745.

There are various processes well-known in the art for producing these synthetic crystalline aluminosilicate zeolites. The so-called gel synthesis process usually involves crystallization of the zeolites from reaction mixtures containing suitable sources of alkali metal oxide, silica, alumina and water. The proportions of these various ingredients will determine the type of zeolite obtained, as well as its crystallinity and the yield of final product.

Generally, alumina may be added in the form of sodium aluminate, alumina sol, alumina trihydrate and the like; silica, in the form of sodium silicate, silica gel, silica sol, etc., silica sol being particularly preferred, and the alkali metal oxide as sodium hydroxide, sodium aluminate, sodium silicate, etc. These reactants are then put into solution and thoroughly mixed at ambient temperature, heated to a temperature generally of from about 80 to about 150° C., and held at that temperature for a sufficient time for the crystallized product to form. Pressure must be applied at temperatures above 100° C. to prevent substantial loss of water from the reaction mixture, and at about 100° C., typical optimum crystallization times range from 48 to about 240 hours.

Following crystallization, the zeolite crystals are filtered and preferably thoroughly washed until the wash water has a pH of about 10.5 to 11. The crystals may then be dried and activated.

These known methods for preparing synthetic crystalline aluminosilicates are deficient in the following aspects.

The gel synthesis process is capable of making high-silica products, but requires expensive raw materials, particularly where silica sol is employed. In addition to the high cost of raw materials, this process requires a long crystallization procedure involving both cooling and heating, which limits production.

Recently, a novel process has been discovered whereby crystalline aluminosilicates are prepared from other crystalline aluminosilicates using a simple process employing treatment with alkali metal hydroxide solutions.

SUMMARY OF THE INVENTION

In accordance with the present invention, it has been discovered that the preparation of crystalline aluminosilicate zeolites by treatment of an initial crystalline aluminosilicate zeolite, characterized by a particular $SiO_2/Al_2O_3$ mole ratio and a particular X-ray diffraction pattern distinguishing its particular crystal structure, with an aqueous alkali metal hydroxide solution may be promoted in such a way as to prepare an improved yield of a product of improved crystallinity. This may be accomplished by the addition of certain soluble salt solutions (promoters) to the alkali metal hydroxide-containing reaction mixture, or to the initial crystalline aluminosilicate zeolite prior to contact with the alkali metal hydroxide solution. By utilizing the process of the present invention, the final crystalline aluminosilcate zeolites produced, having a lower silica/alumina mole ratio than that of the starting material, and exhibiting completely different final crystal structures therefrom, and further characterized by having X-ray diffraction patterns containing X-ray lines which did not appear in the diffraction pattern of the original crystalline zeolite, are prepared in improved yields and with a higher degree of crystallinity.

Additionally, in accordance with the present invention, crystalline aluminosilicate zeolites are produced which have a particle size considerably smaller than those producible by synthesis techniques heretofore known.

DETAILED DESCRIPTION

The crystalline zeolite treatment of the present invention primarily consists of contacting the initial crystalline aluminosilicate zeolite with an aqueous solution containing alkali metal hydroxide and a soluble salt solution. Preferably, NaOH will be utilized along with a soluble halide compound. It is preferred that high concentrations of alkali solution be utilized in the process of the present invention, preferably from 10 to 50% NaOH, and most preferably from 20 to 35% NaOH solution and that the solution also contain from 0.5 to 10% of the soluble salt, preferably from 1 to 6%, and most preferably 2 to 4%. The initial crystalline zeolite is blended with the alkali metal hydroxide-soluble halide containing solution, and is so treated for from about 1 to 100 hours, preferably from 2 to 24 hours and most preferably, from 4 to 6 hours, and at from about 25 to 150° C., preferably 80 to 130° C., and most preferably from 90 to 100° C.

The soluble salt solution utilized may include a halide, nitrate, cyanide, or mixtures thereof, and preferably a halide, and from among the preferred halides, i.e., chlorides and bromides, the chlorides will be particularly preferred. Cations associated with these anions will be any positive metal ion or ammonium ion, with the metal ions being those ions chosen from Groups I-A through IV-A of the Periodic Table of the Elements. These will thus include alkali metals, the alkaline earth metals, the transition metals, $Cu^+$, $Al^{+3}$, $Sn^{+2}$, etc., as well as various combinations of two or more of these metals. The preferred metals will be those such as sodium, lithium, magnesium, cadmium, iron, cobalt, nickel, copper and ammonium cations, with sodium, lithium, magnesium, cadmium and ammonium being more preferred and most preferably sodium.

The most preferred soluble salt solutions will thus be NaCl, LiCl, $MgCl_2$, NaCN, etc., with sodium chloride being particularly preferred.

While it is preferred that the soluble salt be present in the alkali metal hydroxide-zeolite slurry, it is also possible to initially contact the initial zeolite with the soluble salt solution, followed by contact with the alkali metal hydroxide solution, or to utilize a combination of these contacts, employing the soluble salt solution in both such as initial contacting and along with the alkali metal hydroxide solution.

The ratio of alkali metal hydroxide to the initial crystalline zeolite utilized will be from above about 0.2 up to about 0.6 on a weight basis, preferably above about 0.2 up to about 0.5, and most preferably from about 0.22 to about 0.40. It is possible to utilize higher ratios of alkali metal hydroxide to zeolite than these, but such a treatment results in a crystalline zeolite product having lower, and thus less desirable, $SiO_2/Al_2O_3$ mole ratios.

The ratio of soluble salt to the initial crystalline zeolite utilized will be from about 0.005 to about 0.15 on a weight basis, preferably from about 0.01 to about 0.10 and most preferably from about 0.02 to about 0.04.

The above-described treatment results in a complete alteration of the crystal structure of the initial crystalline zeolite employed, and additionally extracts silica from the initial composition, thereby resulting in a lower $$SiO_2/Al_2O_3$$

mole ratio in the final zeolite as compared to the initial crystalline zeolite utilized. The severity of this caustic treatment may be regulated so as to control the difference in $SiO_2/Al_2O_3$ ratio between the starting zeolite and the final zeolite produced thereby. That is, within the limits of alkali metal hydroxide solution discussed above, it is possible to vary its concentraton in order to extract varying amounts of $SiO_2$ therefrom, and thus alter the $SiO_2/Al_2O_3$ ratio of the final crystalline zeolite product obtained. Normally, between about 50% and 80% of the $SiO_2$ content of the initial zeolite will be extracted, preferably from 50 to 70% and most preferably from 55 to 60%.

The initial blending of the initial crystalline zeolite with alkali metal hydroxide and soluble salt will be in the presence of water and the ratio of $H_2O$/zeolite employed will be from between about 0.3 gram per gram to about 2.0 grams per gram, preferably from 0.5 to 1.5 grams per gram and most preferably from 0.9 to 1.1 grams per gram.

The entire zeolite preparation process of the present invention may be summarized as follows:

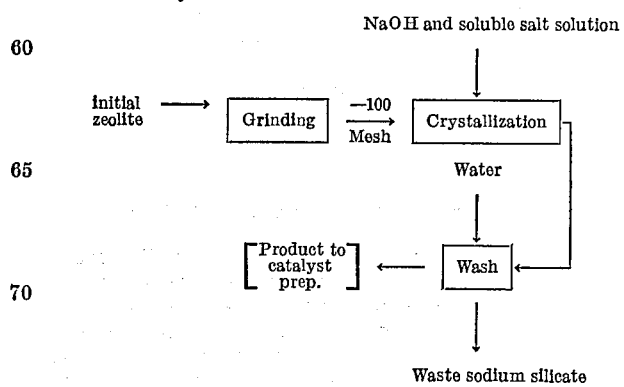

If the final crystalline aluminosilicate zeolite produced by the process of the present invention is to be employed as a catalytic agent suitable in hydrocarbon conversion processes such as catalytic cracking, hydrocracking, reforming, alkylation, isomerization, hydroisomerization, etc., it is desirable to have a major proportion, and in some cases substantially all, of the original alkali metal content of said zeolite removed from the zeolite by a base exchange operation. Preferably the zeolites will be subjected to cation exchange to reduce their alkali metal oxide content to less than about 5 wt. percent, preferably less than about 3 wt. percent, and most preferably less than about 2 wt. percent. Conventionally, the alkali metal oxide content has been reduced by ion exchange treatment with solutions of ammonium salt, or salts of metal in Groups II to VIII of the Periodic Table or the rare earth metals, preferably metals in Groups II, III, IV, V, VI–B, VII–B, VIII and the rare earth metals. Mixtures of these cations have also been employed. The most preferred cations for such use are hydrogen, ammonium and other hydrogen precursors, calcium, magnesium, zinc, nickel and the rare earths, with hydrogen and rare earth cations being particularly preferred.

For use in conversion process with added hydrogen such as hydrocracking, the hydrogen and/or rare earth forms of these zeolites are preferred, most preferably the hydrogen form. After suitable ion exchange, the modified crystalline zeolite is then composited or impregnated with a metallic hydrogenation component such as the platinum group metals, and including platinum, palladium, iridium, rhenium, nickel, cobalt, tungsten and molybdenum, with palladium or a combination of nickel and tungsten being particularly preferred.

These hydrogenation components may be so incorporated into the zeolite by treatment with a component such as a platinum or palladium salt or ammonium complex, e.g., platinous tetraamino dichloride, ammonium chloroplatinate, palladium chloride, etc. The amount of hydrogenation metal in the final catalyst is ordinarily from between about 0.1 to about 10 wt. percent preferably 0.5 to 2.0 wt. percent, and most preferably 0.5 to 1.0 wt. percent based on the zeolite. Normally, the catalyst is then subjected to a heat treatment or a hydrogen treatment at elevated temperatures, e.g., 250 to 500° C., to reduce the platinum group metal, at least in part, to its elemental state.

The catalytic conversions, with added hydrogen in which the above catalysts may be used are in general carried out at elevated temperatures of about 500 to 800° F., pressures of 500 to 1500 p.s.i.g., liquid hourly space velocities of about 0.5 to 20 using hydrogen in amounts of about 1000 to 8000 s.c.f./b.f. feed. It is understood, however, that the selection of specific operating conditions within these broad ranges will depend upon the particular type of conversion which is desired, as well as the specific catalyst employed.

For use as adsorbents the final zeolites produced by the process of the present invention may be used under conventional conditions involving contact of the feed mixture with a fixed or moving bed of the adsorbent, generally at relatively low temperatures of, e.g., 75 to 200° F. and at atmospheric or superatmospheric pressures. These zeolites in general adsorb polar compounds such as alcohols, amines, ketones, esters and acids in preference to relatively non-polar compounds such as hydrocarbons. Aromatic hydrocarbons are generally adsorbed in preference to non-aromatic hydrocarbons of the same molecular size. When utilizing small pore diameter zeolites (e.g. having uniform pores of from 4 to 6 angstroms) small molecular species are adsorbed in preference to larger molecules of the same chemical genus; and straight chain paraffins and olefins in preference to the branched chain species. Regeneration of the rich adsorbent may be effected by conventional means, as for example, steam stripping vacuum desorption, displacement exchange, etc.

The initial crystalline aluminosilicate zeolites which may be employed in the process of the present invention may be represented by the following molar formula:

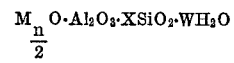

wherein "M" is selected from the group consisting of metal cations and hydrogen, "$n$" is a valence, and "X" is a number from about 5 to 12, and may be either large pore (e.g. having uniform pores of from about 6 to 15 angstroms) or small pore molecular sieves. Preferably, the initial crystalline zeolite utilized will have a high $SiO_2/Al_2O_3$ ratio greater than about 6, more preferably greater than about 9 and most preferably greater than about 10, i.e. from about 10 to about 11. The preferred initial crystalline zeolites utilized are mordenite and clinoptilolite. The most preferred initial crystalline zeolite is clinoptilolite.

The final zeolite product produced by the processes of the present invention will have a $SiO_2/Al_2O_3$ mole ratio lower than that of the initial crystalline zeolite, generally from about 3 to about 5. Preferably, this product will have a $SiO_2/Al_2O_3$ mole ratio above about 3, more preferably above about 3.5, and most preferably above about 4. It is most preferred to prepare a product having as high a $SiO_2/Al_2O_3$ mole ratio as high as possible, but this result may not always be obtainable while at the same time preparing a product of sufficient crystallinity to be useful.

DESCRIPTION OF THE PREFERRED EMBODIMENT

In an extremely important application of the present invention, when the initial crystalline zeolite employed is clinoptilolite, one of the most abundant naturally-occurring zeolites, treatment according to the process of the present invention results in the synthesis of the valuable zeolite faujasite.

Faujasite is a rare crystalline aluminosilicate mineral which, in its naturally-occurring state, contains calcium ions and sodium ions in base-exchangeable positions. Naturally-occurring faujasite has the approximate formula:

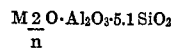

(W. H. Meier and D. H. Olson ["Zeolite Framework"] preprints, p. 386, paper No. 36, 2d Int'l Conference on Zeolites.)

Dehydrated faujasite is a valuable agent for the selective adsorption of molecules from mixtures of molecules of varying sizes on the basis of differences in size between the molecules in that mixture. The ion-exchanged form of faujasite is extremely valuable as a catalytic agent in various hydrocarbon conversion processes. It is particularly valuable as a hydrocarbon cracking catalyst when embedded in suitable matrix materials, such as aluminosilicate gels (13–25% $Al_2O_3$), or mixtures of such gels with natural materials such as kaolin clay, and as a hydrocracking catalyst when impregnated with a suitable hydrogenation component such as a platinum group metal, particularly palladium.

Crystalline molecular sieves chemically different from faujasite but similar in structure have been synthesized in the past. These zeolites have the approximate formula:

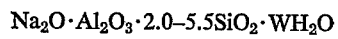

These zeolites, known as "type X" and "type Y" zeolites are similar to each other in many respects, although type Y zeolites is richer in silica than type X. The X-ray powder diffraction pattern of each of these zeolites, before and after dehydration, is characterized by the presence of a well-defined peak at 6.2°2Θ as well as other peaks characteristic of the mineral faujasite. An X-ray diffraction pattern for faujasite is contained in Table A.

TABLE A

X-ray Diffraction Pattern for Faujasite

| d | I | d | I |
|---|---|---|---|
| 14.2 | vs | 3.57 | w |
| 8.76 | m | 3.46 | m |
| 7.44 | m | 3.296 | s |
| 5.64 | s | 3.215 | m |
| 5.02 | w | 3.018 | m |
| 4.75 | m | 2.912 | m |
| 4.36 | s | 2.849 | s |
| 4.17 | w | 2.763 | m |
| 3.91 | m | 2.710 | w |
| 3.76 | s | 2.633 | m |
|  |  | 2.592 | m |

The following terminology applies with the intensity rated on a scale of 1–10 in parenthesis: vs—very strong (10); s—strong (7–9); m—medium (4–6); w—weak (2–3); vw—very weak (1). This X-ray pattern readily distinguishes molecular sieves of the faujasite family from zeolites of other crystal structures, including zeolites having similar molecular sieve properties but possessing different cell dimensions, crystal structures and adsorption properties.

These faujasite-type zeolites have been produced by precipitating finely-divided crystals of the zeolite from an aqueous gel containing solubilized sources of sodium oxide, aluminum oxide and silica, e.g. a mixture of sodium silicate and sodium aluminate or an aqueous suspension of colloidal silica and a solution of sodium aluminate. As is the case with most crystallization processes in which crystals are precipitated from dilute reactants, prior art processes for precipitating synthetic faujasite entail the use of reactants of high purity. The reactants are quite expensive and the synthetic zeolite products are prohibitive in cost for many uses.

Additionally, several recent developments have been made in the area of zeolite synthesis. For example, U.S. Pat. 3,037,843 describes a zeolite preparation process which may be used to prepare a zeolite with a silica-to-alumina ratio approaching that of faujasite, whereby a clay mineral such as kaolin, kaolinite, halloysite, bentonite, and bauxite, is treated with dilute caustic at elevated temperature and pressure, when the non-adsorptive crystalline precipitate is treated with an acid to form the corresponding "permutitic" and then treated with dilute alkali at elevated temperatures, and wherein additionally a soluble silicate is added in this last step; see also U.S. Pat. 3,100,684 and U.S. Pat. 3,114,603.

crystallite sizes yield improved rates of sorption, desorption, and catalysis because of their increased surface area. This results in the improved transfer of sorbates, reactants and products from the gas phase to the zeolite crystallite.

The present product also shows cell sizes of from about 24.78 to about 24.84 A. compared to 24.92 A. for type X (2.7 $SiO_2/Al_2O_3$).

Clinoptilolite is an extremely abundant natural crystalline aluminosilicate zeolite which has not been found useful for purposes of the adsorption or catalysis of hydrocarbons heretofore. The reason for this is the very low surface area of this mineral, and its concomitant lack of adsorptive capacity, irrespective of its high silica to alumina molar ratio of about 11. A review of the characteristics of this material appears in the American Mineralogist, vol. 45, 1960, at pages 351–369, in an article by F. A. Mumpton, which includes a review of the X-ray diffraction pattern of a clinoptilolite sample from Mt. Hector, Calif. Such a pattern is simplified in Table B.

TABLE B

X-ray Diffraction Pattern for Clinoptilolite

| d | O | d | I |
|---|---|---|---|
| 9.00 | vs | 3.73 | vw |
| 7.94 | m | 3.55 | w |
| 6.77 | w | 3.46 | w |
| 6.64 | w | 3.42 | m |
| 5.91 | vw | 3.12 | w |
| 5.24 | w | 3.07 | w |
| 5.11 | vw | 3.04 | w |
| 4.69 | w | 2.97 | m |
| 4.48 | w | 2.87 | vw |
| 4.34 | w | 2.82 | w |
| 3.96 | vs |  |  |
| 3.90 | s |  |  |
| 3.83 | vw |  |  |

EXAMPLE 1

In order to demonstrate the most preferred embodiment of the present invention, a sample of clinoptilolite from Mt. Hector, Calif. was treated according to the present process, and the new crystalline aluminosilicate zeolite product obtained had the crystal structure and characteristic X-ray diffraction pattern of the extremely valuable naturally-occurring mineral faujasite, and its synthetic counterparts, zeolites X and Y, manufactured by the Linde Division of the Union Carbide Corporation. The treatment then was carried out, both with and without the addition of the promoter NaCl and the products obtained are recorded in Table I.

TABLE I.—CONVERSION OF CLINOPTILOLITE

| Run No. | Synthesis reactants | | | | Conditions | | Products | | |
|---|---|---|---|---|---|---|---|---|---|
|  | Zeolite (clinoptilolite), g. | NaOH, g. | Promoter | $H_2O$, g. | Time, hrs. | Temp., °C. | Faujasite | (Cryst.)[1] | Other |
| 1 | [2] 100 | 30 | NaCl [3] | 100 | 7 | 100 | Yes | 126 | None. |
| 2 | [4] 100 | 30 | None | 105 | 8 | 100 | Yes | 91 | Do. |
| 3 | [2] 100 | 30 | do | 100 | 24 | 70 | Yes | 65 | Clinoptilotile. |
| 4 | [2] 100 | 30 | do | 100 | 24 | 60 | Yes | 46 | None. |

[1] Relative to a pure synthetic Na-faujasite laboratory standard which has been assigned a crystallinity of 230.
[2] Sample from Mt. Hector, California, having a $SiO_2/Al_2O_3$ molar ratio of 9.9 and an $H_2O$ content of 15 wt. percent.
[3] Sample was pre-exchanged with 20% NaCl solution before NaOH treatment.
[4] Sample from Mt. Hector, California, having a $SiO_2/Al_2O_3$ molar ratio of 10.7 and an $H_2O$ content of 14 wt. percent.

It is particularly noted that the faujasite produced by the process of the present invention is unique from any faujasite either naturally occurring or heretofore synthesized.

That is, the final product has an average uniform particle size considerably smaller than has heretofore been obtainable. Generally, it will have a particle size less than about 0.5 micron, usually between 0.1 and 0.5 micron, and preferably less than about 0.3 micron. These smaller It is thus clear that the preparation of a valuable faujasite-type product of improved crystallinity may be obtained from the cheap and abundant source of the crystalline zeolite clinoptilolite by the relatively simple and inexpensive process of the present invention. In addition, a comparison is made in Table II between the faujasite product obtained by the present process, and the present commercially-available synthetic zeolites having the faujasite structure, namely zeolites X and Y.

TABLE II

| Property | Linde Zeolite X | Linde Zeolite Y | Faujasite type zeolite of the present process |
|---|---|---|---|
| X-ray crystallinity | 180 | 230 | 90–145 |
| Unit cell size, A | 24.92 | 24.69 | 24.78–24.84 |
| Surface area, $M_2$./g | 800–850 | 850–900 | 650–700 |
| Particle size, $\mu$ | 3–5 | 1.0–1.3 | 0.1–0.5 |
| $SiO_2/Al_2O_3$ | 2.5–3.0 | 4.9 | 3.8–4.3 |

It is thus clear that the faujasite-type zeolite produced by the process of the present invention is unique in certain very critical aspects, particularly in that it has a particle size, or crystallite size, which is considerably smaller than that which has been heretofore obtainable.

Its silica content, which is represented by the ratio of $SiO_2$ to $Al_2O_3$, is intermediate between that of zeolites X and Y.

EXAMPLE 2

In order to further demonstrate the use of NaCl as well as other such promoters in the present process, several additional promoters were utilized in the preparation of the faujasite from clinoptilolite. The results obtained are recorded in Table III.

TABLE III.—PROMOTION OF CLINOPTILOLITE CONVERSION TO FAUJASITE

| | Synthesis reactants | | | | Conditions | | Products | |
|---|---|---|---|---|---|---|---|---|
| | Zeolite | | | | | | | |
| Run No. | Type | Amount, g. | NAOH, g. | $H_2O$, g. | Promoter [1] | Time, hrs. | Temp., °C. | Faujasite | Cryst.[2] |
| 5 | Clinoptilolite [3] | 100 | 30 | 100 | LiCl | 16 | 100 | Yes | 48 |
| 6 | do | 100 | 30 | 100 | NaCl | 16 | 100 | Yes | 57 |
| 7 | do | 100 | 30 | 100 | KCl | 16 | 100 | Yes | 12 |
| 8 | do | 100 | 30 | 100 | $MgCl_2$ | 16 | 100 | Yes | 41 |
| 9 | do | 100 | 30 | 100 | $CaCl_2$ | 16 | 100 | Yes | 18 |
| 10 | do | 100 | 30 | 100 | $SrCl_2$ | 16 | 100 | Yes | 9 |
| 11 | do | 100 | 30 | 100 | $BaCl_2$ | 16 | 100 | Yes | 2 |
| 12 | do | 100 | 30 | 100 | $NH_4Cl$ | 16 | 100 | Yes | 23 |
| 13 | do | 100 | 30 | 100 | $FeCl_3$ | 16 | 100 | Yes | 28 |
| 14 | do | 100 | 30 | 100 | $FeCl_2$ | 16 | 100 | Yes | 37 |
| 15 | do | 100 | 30 | 100 | $CoCl_2$ | 16 | 100 | Yes | 26 |
| 16 | do | 100 | 30 | 100 | $NiCl_2$ | 16 | 100 | Yes | 32 |
| 17 | do | 100 | 30 | 100 | $CuCl_2$ | 16 | 100 | Yes | 22 |
| 18 | do | 100 | 30 | 100 | CuCl | 16 | 100 | Yes | 22 |
| 19 | do | 100 | 30 | 100 | $CdCl_2$ | 16 | 100 | Yes | 39 |
| 20 | do | 100 | 30 | 100 | $HgCl_2$ | 16 | 100 | Yes | 9 |
| 21 | do | 100 | 30 | 100 | $AlCl_3$ | 16 | 100 | Yes | 23 |
| 22 | do | 100 | 30 | 100 | $SnCl_2$ | 16 | 100 | Yes | 26 |
| 23 | do.[4] | 50 | 15 | 50 | NaCl (5.6 g.) | 7 | 100 | Yes | 74 |
| 24 | do | 50 | 15 | 50 | NaCl (5.6 g.) | 24 | 100 | Yes | 80 |

[1] Amount to give 3 wt. percent chloride on dry zeolite reactant used in runs 6–23.
[2] Relative to a pure synthetic Na-faujasite laboratory standard which has been assigned a crystallinity of 230.
[3] Sample from Fish Creek Mountain, Nevada, having a $SiO_2/Al_2O_3$ molar ratio of 9.7 and an $H_2O$ content of 15 wt. percent.
[4] Sample from Mt. Hector, California, having a $SiO_2/Al_2O_3$ molar ratio of 9.9 and an $H_2O$ content of 15 wt. percent.

It is clear from these results that within the range of from above about 0.2 to about 0.6 (caustic/zeolite), the treatment process of the present invention will successfully result in the conversion of the initial zeolite into a final zeolite with an entirely different crystal structure and a lower $SiO_2/Al_2O_3$ mole ratio. More importantly, within the range of from above about 0.2 up to about 0.5 (caustic/zeolite), and preferably from 0.22 to 0.4, the new zeolite thus synthesized is the highly desired faujasite-type zeolite.

EXAMPLE 3

In order to further demonstrate the utility of the present improved process, the conversion of clinoptilolite to other product crystalline aluminosilicate zeolites, and the conversion of other starting crystalline aluminosilicate zeolites was promoted according to the present process. The results are recorded in Table IV.

TABLE IV.—PROMOTION OF OTHER ZEOLITE CONVERSIONS

| | Synthesis reactants | | | | | | | | |
|---|---|---|---|---|---|---|---|---|---|
| | Zeolite | | | | | | | | |
| Run | Type | Amount, g. | NAOH, g. | $H_2O$, g. | Promoter | Time, hrs. | Temp., °C. | Zeolite | Cryst.[1] | Others |
| 25 | Mordenite [2] | 50 | 15 | 50 | KCl, 0.6 g | 24 | 100 | Phillipsite | 0 | |
| 26 | do | 50 | 15 | 50 | $FeCl_3$, 0.6 g | 24 | 100 | Faujasite | 30 | Phillipsite. |
| 27 | do | 50 | 15 | 50 | $CaCl_2$, 2.4 g | 24 | 100 | do | 132 | Mordenite. |
| 28 | do | 50 | 15 | 50 | $MgCl_2$, 0.7 g | 16 | 100 | do | 121 | Phillipsite. |
| 29 | do | 50 | 15 | 50 | $CrCl_3$, 0.13 g | 16 | 100 | do | 50 | Mordenite. |
| 30 | do | 50 | 15 | 50 | $MnCl_2$, 0.09 g | 16 | 100 | do | 30 | Do. |
| 31 | do | 50 | 15 | 50 | $NiCl_2$, 0.10 g | 16 | 100 | do | 50 | Do. |
| 32 | do | 50 | 15 | 50 | $ZnCl_2$, 0.05 g | 24 | 100 | do | 50 | Do. |
| 33 | do | 50 | 15 | 50 | $CuCl_2$, 0.07 g | 24 | 100 | do | 50 | Do. |
| 34 | do | 50 | 15 | 50 | NaCl, 5.6 g | 24 | 100 | do | 129 | Do. |
| 35 | do | 50 | 15 | 50 | None | 24 | 100 | do | 5 | Do. |

[1] Relative to a pure synthetic Na faujasite laboratory standard which has been assigned a crystallinity of 230.
[2] Sample from the Norton Company, having a $SiO_2/Al_2O_3$ molar ratio of 10.5 and an estimated $H_2O$ content of 5 wt. percent.

EXAMPLE 4

In order to further demonstrate the utility and breadth of the present invention, several other conversions were carried out employing various combinations of promoters. The conversions achieved are recorded in Table V.

EXAMPLE 5

In order to further demonstrate the utility and breadth of the present invention, several other promoters were employed, and the conversions achieved are recorded in Table VI.

TABLE V.—PROMOTION OF ZEOLITE CONVERSIONS WITH COMBINATIONS OF PROMOTERS

| Run No. | Synthesis reactants | | | | | Conditions | | Products | | |
|---|---|---|---|---|---|---|---|---|---|---|
| | Zeolite | | | | | | | | | |
| | Type | Amount, g. | NaOH, g. | H₂O, g. | Promoter | Time, hrs. | Temp., °C. | Zeolite | Cryst.* | Other |
| 36 | Clinoptilolite¹ | 100 | 30 | 100 | NaCl plus LiCl⁷ | 16 | 10 | Faujasite | 57 | |
| 37 | do | 100 | 30 | 100 | NaCl plus FeCl₂⁷ | | | do | 60 | |
| 38 | do | 100 | 30 | 100 | NaCl plus NiCl₂⁷ | | | do | 67 | |
| 39 | do | 100 | 30 | 100 | NaCl plus MgCl₂⁷ | | | do | 60 | |
| 40 | do | 100 | 30 | 100 | NaCl plus ZnCl₂⁸ | | | do | 46 | |
| 41 | Synthetic mordenite² | 50 | 15 | 50 | Chlorides of K, Fe, Ca, Mg, Cr, Mn, Ni, Zn and Cu.⁹ | 8 | 100 | do | 30 | Mordenite. |
| 42 | do | 50 | 15 | 50 | | 24 | 100 | do | 107 | Gmelinite. |
| 43 | Mordenite³ | 50 | 15 | 50 | Chlorides of K, Mg, Ca and Zn.⁹ | 16 | 100 | do | 80 | Mordenite. |
| 44 | do | 50 | 15 | 50 | | 24 | 100 | do | 70 | Do. |
| 45 | do | 50 | 15 | 50 | Chlorides of Fe, Cr, Mn, Ni, and Cu.⁹ | 16 | 100 | do | 105 | Do. |
| 46 | do | 50 | 15 | 50 | | 24 | 100 | do | 100 | Phillipsite. |
| 47 | Clinoptilolite⁴ | 50 | 15 | 50 | CaCl₂ (2.3 g.) plus MgCl₂ (0.7 g.). | 16 | 100 | Phillipsite | | Impurity C. |
| 48 | do | 50 | 15 | 50 | do | 24 | 100 | do | | Chabazite. |
| 49 | do | 50 | 15 | 50 | Chlorides of K, Ca, Mg, and Zn.⁹ | 16 | 100 | do | | Clinoptilolite. |
| 50 | do | 50 | 15 | 50 | | 24 | 100 | do | | Do. |
| 51 | do | 50 | 15 | 50 | Chlorides of Fe, Cr, Ni and Cu.⁹ | 16 | 100 | do | | Impurity C. |
| 52 | Heulandite⁵ | 50 | 15 | 50 | Chlorides of K, Fe, Ca, Mg, Cr, Mn, Ni, Zn and Cu.⁹ | 16 | 100 | Faujasite | 30 | Chabazite. |
| 53 | do.⁶ | 15 | 4.5 | 15 | | 16 | 100 | Phillipsite | | Unidentified. |

¹ Sample from Fish Creek, Nevada having an SiO₂/Al₂O₃ molar ratio of 9.7 and an H₂O content of 15 wt. percent.
² Sample from the Hüber Company, having an SiO₂/Al₂O₃ molar ratio of 10.9 and an estimated H₂O content of 5 wt. percent.
³ Sample from the Norton Company, having an SiO₂/Al₂O₃ molar ratio of 10.5 and an H₂O content of 5 wt. percent.
⁴ Sample from Elko, Nevada, having an SiO₂/Al₂O₃ molar ratio estimated as 10.0 and an H₂O content estimated at 15 wt. percent.
⁵ Sample from Reese, Nevada, having an SiO₂/Al₂O₃ molar ratio estimated at 9.0 and an H₂O content estimated at 15 wt. percent.
⁶ Sample from Rome, Oregon, having an SiO₂/Al₂O₃ molar ratio of 9.1 and an H₂O content estimated at 15 wt. percent.
⁷ Amount to give 3 wt. percent chloride on dry zeolite reactant; 90% of chloride from NaCl.
⁸ Amount to give 3 wt. percent chloride on dry zeolite reactant; 75% of chloride from NaCl.
⁹ Amounts to approximate metals in sample from Mt. Hector, California.
*Relative to a pure synthetic Na faujasite laboratory standard which has been assigned a crystallinity of 230.

TABLE VI.—CONVERSIONS UTILIZING PROMOTERS OTHER THAN CHLORIDES

| Run No. | Synthesis reactants | | | | | Conditions | | Products | | |
|---|---|---|---|---|---|---|---|---|---|---|
| | Zeolite | | | | | | | | | |
| | Type | Amount, g. | NaOH, g. | H₂O, g. | Promoter | Time, hrs. | Temp., °C. | Zeolite | Cryst.* | Other |
| 54 | Synthetic mordenite¹ | 50 | 15 | 50 | Sulfates of Ca, Mg, K and Zn. | 16 | 100 | Gmelinite | 0 | Chabazite. |
| 55 | do | 50 | 15 | 50 | MgCl₂·6H₂O (.34 g.) | 16 | 100 | Faujasite | 50 | Mordenite. |
| 56 | do | 50 | 15 | 50 | MgCl₂·6H₂O (3.4 g.) | 24 | 100 | do | 132 | Do. |
| 57 | do | 50 | 15 | 50 | AlCl₃·6H₂O (3.8 g.) | 24 | 100 | do | 160 | Do. |
| 58 | do | 50 | 15 | 50 | NaF (2 g.) | 16 | 100 | do | 40 | Do. |
| 59 | do | 100 | 30 | 100 | Na₂CO₃ (10 g.) | 16 | 100 | do | 50 | Do. |
| 60 | do | 100 | 30 | 100 | Na₂CO₃ (10 g.) | 24 | 100 | do | 10 | Gmelinite. |
| 61 | do.² | 50 | 15 | 50 | Na₂SO₄ (6.8 g.) | 7 | 100 | do | 10 | Mordenite. |
| 62 | do | 50 | 15 | 50 | Na₂SO₄ (6.8 g.) | 24 | 100 | Gmelinite | 0 | |
| 63 | do¹ | 100 | 30 | 100 | NaBr (19.7 g.) | 7 | 100 | Faujasite | 30 | Do. |
| 64 | do | 100 | 30 | 100 | NaBr (19.7 g.) | 24 | 100 | do | 100 | Do. |
| 65 | Clinoptilolite³ | 50 | 15 | 50 | Na₂SO₄ (6.8 g.) | 24 | 100 | do | 82 | |

¹ Sample from the Norton Company having a SiO₂/Al₂O₃ molar ratio of 10.5 and an estimated H₂O content of 5 wt. percent.
² Sample from the Hüber Company, having a SiO₂/Al₂O₃ molar ratio of 10 and an estimated H₂O content of 5 wt. percent.
³ Sample from Mt. Hector, California, having a SiO₂O₃ molar ratio of 9.9 and an H₂O content of 15 wt. percent.
*Relative to a pure synthetic Na faujasite laboratory standard which has been assigned a crystallinity of 230.

Obviously, many modifications and variations of this invention may be made without departing from the essence and scope thereof, and only such limitations should be applied as are indicated from the appended claims.

What is claimed is:

1. In a method for preparing a crystalline aluminosilicate zeolite which comprises treating an initial crystalline aluminosilicate zeolite having a formula, expressed in terms of mole ratios of oxides, as follows:

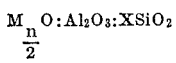

$$M_{\frac{2}{n}}O : Al_2O_3 : XSiO_2$$

wherein "M" is selected from the group consisting of meal cations and hydrogens, "n" in its valence and "X" is greater than about 5, with an aqueous alkali metal hydroxide solution such that the ratio of said alkali metal hydroxide to said initial crystalline aluminosilicate zeolite ranges from about 0.2 up to about 0.6 on a weight basis, said treatment carried out in the presence of sufficient water such that the ratio of said water to said initial crystalline aluminosilicate zeolite is from about 0.3 to about 2.0, on a weight basis, at a temperature in the range of from about 25 to 150° C., so that at least a portion of said initial crystalline aluminosilicate zeolite is converted into a final crystalline aluminosilicate zeolite having a lower SiO₂/Al₂O₃ mole ratio and a final crystal structure different from that of said initial crystalline zeolite, said difference in structure characterized by a final X-ray diffraction pattern containing X-ray lines which did not appear in the X-ray diffraction pattern of said initial crystalline zeolite, the improvement which comprises adding a salt solution comprising a salt selected from the group consisting of halides, sulfates, nitrates, cyanides and carbonates to said initial crystalline aluminosilicate zeolite-alkali metal hydroxide solution in an amount such that the ratio of said salt to said initial crystalline aluminosilicate zeolite ranges from about 0.005 to about 0.15 on a weight basis.

2. The method of claim 1 wherein said final crystalline aluminosilicate zeolite has a SiO₂/Al₂O₃ mole ratio of greater than about 3.

3. The method of claim 1 wherein said final crystalline aluminosilicate zeolite comprises faujasite.

4. The method of claim 2 wherein said initial crystalline aluminosilicate zeolite comprises clinoptilolite.

5. The method of claim 1 wherein said alkali metal hydroxide comprises NaOH.

6. The method of claim 1 wherein said soluble salt comprises a chloride.

7. The method of claim 6 wherein said soluble salt comprises sodium chloride.

8. In a method for preparing a crystalline aluminosilicate zeolite which comprises treating an initial crystalline aluminosilicate zeolite having a formula, expressed in terms of mole ratios of oxides, as follows:

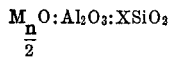

wherein "M" is selected from the group consisting of metal cations and hydrogen, "n" is its valence and "X" is greater than about 5, with an aqueous alkali metal hydroxide solution such that the ratio of said alkali metal hydroxide to said initial crystalline aluminosilicate zeolite ranges from about 0.2 up to about 0.6 on a weight basis, said treatment carried out in the presence of sufficient water such that the ratio of said water to said initial crystalline aluminosilicate zeolite is from about 0.3 to about 2.0, on a weight basis, at a temperature of from about 25 to 150° C. for from about 1 to 100 hours, so that at least a portion of said initial crystalline zeolite is converted into a final crystalline aluminosilicate zeolite having a lower $SiO_2/Al_2O_3$ mole ratio and a final crystal structure different from that of said initial crystalline zeolite, said difference in structure characterized by a final X-ray diffraction pattern containing X-ray lines which did not appear in the X-ray diffraction pattern of said initial crystalline zeolite, the improvement which comprises adding to said initial crystalline aluminosilicate zeolite a salt solution comprising a salt selected from the group consisting of halides, sulfates, nitrates, cyanides and carbonates in an amount such that the ratio of said salt to said initial crystalline aluminosilicate zeolite ranges from about 0.005 to about 0.15 on a weight basis, prior to treatment of said initial crystalline aluminosilicate zeolite with said aqueous alkali metal hydroxide solution.

9. The method of claim 8 wherein said final crystalline aluminosilicate zeolite has a $SiO_2/Al_2O_3$ mole ratio of greater than about 3.

10. The method of claim 8 wherein said initial crystalline aluminosilicate zeolite comprises clinoptilolite.

11. The method of claim 8 wherein said alkali metal hydroxide comprises NaOH.

12. The method of claim 8 wherein said soluble salt is contacted with said initial crystalline aluminosilicate zeolite in combination with said alkali metal hydroxide.

13. The method of claim 8 wherein said soluble salt is a salt of a metal ion selected from Groups I–A through IV–A of the Periodic Table and/or ammonium ions.

References Cited
UNITED STATES PATENTS

| | | | |
|---|---|---|---|
| 3,374,182 | 3/1968 | Young | 252—455 Z |
| 3,101,251 | 8/1963 | Howell | 23—113 |

FOREIGN PATENTS

| | | | |
|---|---|---|---|
| 898,457 | 6/1962 | Great Britain | 23—113 |

OTHER REFERENCES

Barrer et al.: "J. Chem. Soc.," 1952, pp. 1561–1565.

EDWARD J. MEROS, Primary Examiner

U.S. Cl. X.R.

423—328, 330